(12) United States Patent
Blankenship et al.

(10) Patent No.: US 11,190,241 B2
(45) Date of Patent: Nov. 30, 2021

(54) PRECODING DIVERSITY IN TIME DOMAIN

(71) Applicant: Telefonaktiebolaget LM Ericsson (publ), Stockholm (SE)

(72) Inventors: Yufei Blankenship, Kildeer, IL (US); Shiwei Gao, Nepean (CA); Robert Mark Harrison, Grapevine, TX (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 635 days.

(21) Appl. No.: 15/223,453

(22) Filed: Jul. 29, 2016

(65) Prior Publication Data
US 2017/0041052 A1    Feb. 9, 2017

Related U.S. Application Data

(60) Provisional application No. 62/201,718, filed on Aug. 6, 2015.

(51) Int. Cl.
*H04B 7/0456* (2017.01)
*H04L 1/08* (2006.01)
(Continued)

(52) U.S. Cl.
CPC .......... *H04B 7/0456* (2013.01); *H04B 1/713* (2013.01); *H04L 1/00* (2013.01); *H04L 1/08* (2013.01);
(Continued)

(58) Field of Classification Search
CPC ..... H04W 4/70; H04B 7/0413; H04B 7/0456; H04L 1/00; H04L 1/08; H04L 25/0224; H04L 25/03343; H04L 5/0094
(Continued)

(56) References Cited

U.S. PATENT DOCUMENTS

2011/0002322 A1* 1/2011 Kim ............... H04J 11/0023
                                                 370/344
2012/0052899 A1* 3/2012 Wang ............. H04W 52/226
                                                 455/513
(Continued)

FOREIGN PATENT DOCUMENTS

WO    2014098700 A1    6/2014
WO    2015017374 A1    2/2015

OTHER PUBLICATIONS

Author Unknown, "Technical Specification Grouip Radio Access Network; Evolved Universal Terrestrial Radio Access (E-UTRA); Physical channels and modulation (Release 12)," Technical Specification 36.211, Version 12.0.0, Dec. 2013, 3GPP Organizational Partners, 120 pages.
(Continued)

*Primary Examiner* — Leila Malek
(74) *Attorney, Agent, or Firm* — Withrow & Terranova, PLLC

(57) ABSTRACT

Systems and methods for enabling precoding diversity in the time domain are provided. In some embodiments, a User Equipment (UE) includes circuitry including a processing module and a memory module configured to receive an indication that a physical channel is repeated over a set of subframes and receive an indication that the UE can assume that a first subset of the repetitions of the physical channel and a reference signal will use a first precoder. In this way, in some embodiments, the UE can coherently combine the repetitions, including the reference signals used by the physical channel. The ability to coherently combine repetitions of the physical channel may improve both the estimates of the physical channel as well as channel estimates derived from the repeated reference signals.

23 Claims, 18 Drawing Sheets

(51) Int. Cl.
*H04L 5/00* (2006.01)
*H04L 25/03* (2006.01)
*H04W 4/70* (2018.01)
*H04L 1/00* (2006.01)
*H04B 1/713* (2011.01)
*H04L 25/02* (2006.01)
*H04B 7/0413* (2017.01)

(52) U.S. Cl.
CPC .......... *H04L 5/0023* (2013.01); *H04L 5/0048* (2013.01); *H04L 25/0224* (2013.01); *H04L 25/03343* (2013.01); *H04L 25/03891* (2013.01); *H04W 4/70* (2018.02); *H04B 7/0413* (2013.01); *H04L 5/0012* (2013.01); *H04L 5/0094* (2013.01)

(58) Field of Classification Search
USPC ........................................................ 375/267
See application file for complete search history.

(56) References Cited

U.S. PATENT DOCUMENTS

2014/0204863 A1 7/2014 Wu
2015/0280876 A1* 10/2015 You ..................... H04L 5/0048
370/329

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.6.0, Jun. 2015, 3GPP Organizational Partners, 136 pages.
Author Unknown, "Technical Specification Group Radio Access Network; Evolved Universal Terrestrial Radio Access (E-UTRA); Physical layer procedures (Release 12)," Technical Specification 36.213, Version 12.6.0, Jun. 2015, 3GPP Organizational Partners, 241 pages.
Author Unknown, "Technical Specification Group Radio Access Network; Evolved Universal Terrestrial Radio Access (E-UTRA); Physical layer procedures (Release 12)," Technical Specification 36.213, Version 12.0.0, Dec. 2013, 3GPP Organizational Partners, 186 pages.
Author Unknown, "Technical Specification Group Radio Access Network; Study on provision of low-cost Machine-Type Communications (MTC) User Equipments (UEs) based on LTE (Release 12)," Technical Report 36.888, Version 12.0.0, Jun. 2013, 3GPP Organizational Partners, 55 pages.
Ericsson, "R1-153733: PDSCH transmission for MTC," 3GPP TSG RAN WG1 Meeting #82, Aug. 24-28, 2015, Beijing, China, 4 pages.
Huawei et al., "R1-153207: Frequency hopping of physical downlink control channel for MTC," 3GPP TSG RAN WG1 Meeting #81, May 25-29, 2015, Fukuoka, Japan, 3 pages.
MediaTek Inc., "R1-131180: Coverage Analysis of PDSCH and Enhancement Techniques for MTC Ues," 3GPP TSG-RAN WG1 #72bis, Apr. 14-19, 2013, Chicago, USA, 7 pages.
Samsung, "R1-140358: PDSCH/PUSCH Coverage Enhancements for MTC UEs," 3GPP TSG RAN WG1 #76, Feb. 10-14, 2014, Prague, Czech Republic, 3 pages.
Search Report for Japanese Patent Application No. 2018-506299, dated Dec. 19, 2018, 42 pages.
Notification of Reasons for Refusal for Japanese Patent Application No. 2018-506299, dated Dec. 25, 2018, 12 pages.
Examination Report for European Patent Application No. 16757965.5, dated Nov. 23, 2018, 7 pages.
ZTE, "R1-152957: Detailed design on PDSCH for MTC enhancement," Third Generation Partnership Project (3GPP) TSG RAN WG1 Meeting #81, May 25-29, 2015, Fukuoka, Japan, 3 pages.
Examination Report for European Patent Application No. 16757965.5, dated Nov. 11, 2020, 7 pages.
Office Action for Brazilian Patent Application No. BR112018002526-7, dated Aug. 18, 2020, 6 pages.
International Search Report and Written Opinion for International Patent Application No. PCT/IB2016/054700, dated Nov. 2, 2016, 11 pages.
Examination Report for European Patent Application No. 16757965.5, dated Aug. 20, 2021, 7 pages.

* cited by examiner

PRECODING DIVERSITY IN TIME DOMAIN

RELATED APPLICATIONS

This application claims the benefit of provisional patent application Ser. No. 62/201,718, filed Aug. 6, 2015, the disclosure of which is hereby incorporated herein by reference in its entirety.

TECHNICAL FIELD

Embodiments of the present disclosure relate to wireless communications, and more particularly to precoding diversity in the time domain.

BACKGROUND

Third Generation Partnership Project (3GPP) Long Term Evolution (LTE) technology is a mobile broadband wireless communication technology in which transmissions from base stations (referred to as evolved NodeBs (eNBs)) to mobile stations (referred to as user equipment (UE)) are sent with a physical layer comprising two basic elements: physical signals and physical channels, as defined in 3GPP TS 36.211 v12.0.0. A physical channel corresponds to a set of resource elements (defined hereafter) carrying information originating from higher layers, while a physical signal is used by the physical layer but does not carry information originating from higher layers. Examples of downlink LTE physical channels include: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid-Automatic Repeat Request Indicator Channel (PHICH), Enhanced Physical Downlink Control Channel (EPDCCH), and Machine Type Communication Physical Downlink Control Channel (MPDCCH). Examples of LTE downlink physical signals include reference signals, synchronization signals, and discovery signals. These downlink physical channels and physical signals are transmitted to UEs using orthogonal frequency division multiplexing (OFDM). FIG. 1 illustrates an LTE wireless communication network with a network node (eNB 10) transmitting to multiple UEs (12-1 through 12-2), according to some embodiments of the present disclosure.

OFDM splits the signal into multiple parallel sub-carriers in frequency. The basic unit of transmission in LTE is a Physical Resource Block (PRB, alternatively called a Resource Block (RB) in the following), which in its most common configuration consists of 12 subcarriers and 7 OFDM symbols (one slot). A unit of one subcarrier and 1 OFDM symbol is referred to as a Resource Element (RE), as is shown in FIG. 2. Thus, an RB includes 84 REs. An LTE radio subframe is composed of multiple RBs in frequency with the number of RBs determining the bandwidth of the system and two slots in time as is shown in FIG. 3. Furthermore, the two RBs in a subframe that are adjacent in time are denoted as an RB pair.

In the time domain, LTE downlink transmissions are organized into radio frames of 10 ms, each radio frame consisting of ten equally-sized subframes of length $T_{subframe}=1$ ms. The signal transmitted by the eNB 10 in a downlink (the link carrying transmissions from the eNB 10 to the UE 12) subframe may be transmitted from multiple antennas, and the signal may be received at a UE 12 that has multiple antennas. The radio channel distorts the transmitted signals from the multiple antenna ports. In order to demodulate any transmissions on the downlink, the UE 12 relies on Reference Symbols (RSs) that are transmitted on the downlink. These RSs and their position in the time-frequency grid are known to the UE 12 and hence can be used to determine channel estimates by measuring the effect of the radio channel on these symbols.

Multi-antenna techniques can significantly increase the data rates and reliability of a wireless communication system. The performance is particularly improved if both the transmitter and the receiver are equipped with multiple antennas, which results in a Multiple-Input Multiple-Output (MIMO) communication channel. Such systems and/or related techniques are commonly referred to as MIMO.

A core component in LTE is the support of MIMO antenna deployments and MIMO related techniques. Currently, LTE-Advanced supports an eight-layer spatial multiplexing mode for eight Tx antennas with channel dependent precoding. The spatial multiplexing mode aims for higher data rates in favorable channel conditions. An illustration of the spatial multiplexing operation is provided in FIG. 4, which shows the transmission structure of a precoded spatial multiplexing mode in LTE.

As illustrated in FIG. 4, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer, and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties. The received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process.

The precoder W can be a wideband precoder, which is constant over frequency, or frequency selective. Note that when the transmission rank is one, the precoder W is an $N_T \times 1$ vector.

The precoder matrix is often chosen to match the characteristics of the $N_R \times N_T$ MIMO channel matrix H, resulting in so-called channel dependent precoding. This is also commonly referred to as closed-loop precoding and essentially strives for focusing the transmit energy into a subspace which is strong in the sense of conveying much of the transmitted energy to the UE 12. In addition, the precoder matrix may also be selected to strive for orthogonalizing the channel, meaning that after proper linear equalization at the UE 12, the inter-layer interference is reduced.

The transmission rank, and thus the number of spatially multiplexed layers, is reflected in the number of columns of the precoder. For efficient performance, it is important that a transmission rank that matches the channel properties is selected.

Machine-Type Communication (MTC) is an important revenue stream for operators and has huge potential from the operator perspective. It is efficient for operators to be able to serve MTC UEs using already deployed radio access technology. Therefore, 3GPP LTE has been investigated as a competitive radio access technology for efficient support of MTC. Lowering the cost of MTC UEs 12 is an important enabler for implementation of the concept of "internet of things". MTC UEs 12 used for many applications will require low operational power consumption and are expected to communicate with infrequent small burst transmissions. In addition, there is a substantial market for Machine-to-Machine (M2M) use cases of devices deployed deep inside buildings which would require coverage enhancement in comparison to the defined LTE cell coverage footprint.

3GPP LTE Rel-12 has defined UE power saving mode allowing long battery lifetime and a new UE category allowing reduced modem complexity. In 3GPP LTE Rel-13, further MTC work is expected to further reduce UE cost and provide coverage enhancement. The key element to enable cost reduction is to introduce reduced UE RF bandwidth of 1.4 MHz in downlink and uplink within any system bandwidth. This bandwidth corresponds to 6 RB.

Messages transmitted over the radio link to users can be broadly classified as control messages or data messages. Control messages are used to facilitate the proper operation of the system as well as proper operation of each UE 12 within the system. Control messages could include commands to control functions such as the transmitted power from a UE 12, signaling of RBs within which the data is to be received by the UE 12 or transmitted from the UE 12, and so on.

In 3GPP LTE Rel-8, the first one to four OFDM symbols, depending on the configuration, in a subframe are reserved to contain such control information as is shown in FIG. 3. For normal (non-MTC) UEs 12 of Rel-11 or later, the UE 12 can be configured to monitor an Enhanced Physical Downlink Control Channel (EPDCCH) in addition to the Physical Downlink Control Channel (PDCCH).

EPDCCH was thus introduced in Rel-11, in which 2, 4 or 8 Physical Resource Block (PRB) pairs in the data region are reserved to exclusively contain EPDCCH transmissions, although they exclude from the PRB pair the one to four first symbols that may contain control information transmitted to UEs 12 from releases earlier than Rel-11, as is shown in FIG. 5 which illustrates a subframe showing 10 RB pairs and configuration of three EPDCCH regions (bottom, middle, and top) of size 1 PRB pair each (the figure is for concept illustration only, as the current LTE specifications for EPDCCH do not support an EPDCCH region of size 1 PRB pair). The remaining PRB pairs can be used for Physical Downlink Shared Channel (PDSCH) transmissions.

Hence, the EPDCCH is frequency multiplexed with PDSCH transmissions, contrary to PDCCH, which is time multiplexed with PDSCH transmissions. Note also that multiplexing of PDSCH and any EPDCCH transmission within a PRB pair is not supported in LTE Rel-11.

Furthermore, two modes of EPDCCH transmission are supported, the localized and the distributed EPDCCH transmission.

To facilitate the mapping of Enhanced Control Channel Elements (ECCEs) to physical resources, each PRB pair is divided into sixteen Enhanced Resource Element Groups (EREGs), and each ECCE is further divided into $N_{EREG}^{ECCE}=4$ or $N_{EREG}^{ECCE}=8$ EREGs. For normal Cyclic Prefix (CP) and normal subframes, $N_{EREG}^{ECCE}=4$ unless some conditions are met as described in TS 36.213. For extended CP and in some special subframes for Frame structure 2 (Time Division Duplexing (TDD)) $N_{EREG}^{ECCE}=8$ is used. An EPDCCH is consequently mapped to a multiple of four or eight EREGs depending on the aggregation level.

These EREGs belonging to an EPDCCH reside in either a single PRB pair (as is typical for localized transmission) or a multiple of PRB pairs (as is typical for distributed transmission). The division of a PRB pair into EREGs is illustrated in FIG. 6, which illustrates a PRB pair of normal CP configuration in a normal subframe. The squares with dark shading include the Demodulation Reference Signals (DMRS). Each tile is an RE in which the number corresponds to the EREG it belongs to. The RE with lighter shading corresponds to the RE belonging to the same EREG indexed with 0 and so on.

The EPDCCHs use DMRSs for demodulation, as shown in FIG. 6. There are 24 REs reserved for DMRS per PRB pair. For distributed EPDCCHs, there are two DMRS antenna ports in each PRB pair for normal CP known as antenna ports 107 and 109. These two ports are used for all distributed EPDCCH messages in the PRB pair and provide two-fold antenna diversity (if the eNB 10 chooses to transmit each port from a separate antenna, which is an implementation choice). For localized EPDCCHs there are up to four antenna ports 107-110 and each port is used by only one EPDCCH message in that PRB pair.

Port 107 uses 12 REs out of the 24 REs in the PRB pair, while port 109 uses the other 12 REs. Hence, the DMRS REs belonging to port 107 and 109 are time and frequency multiplexed in the PRB pair. Ports 107 and 108 (and also ports 109/110), on the other hand, use the same REs but are code multiplexed by applying an Orthogonal Cover Code (OCC) on top of four REs on the same subcarrier.

When receiving the distributed EPDCCH, the UE 12 estimates the channel in each DMRS RE and then it uses the OCC within each subcarrier and the corresponding three subcarriers within the PRB pair to obtain the channel estimates for antenna port 107 and 109 respectively. These channel estimates are then used when demodulating the EPDCCH.

For PDSCH, the antenna port (port 7-15) to use for demodulation of DMRS based transmission modes (9 or 10) is included in the Downlink Control Information (DCI) message that schedules the PDSCH.

The DMRS antenna ports 7-15 for PDSCH use the same RE in the PRB pair as the DMRS ports 107, 109 for EPDCCH. Hence, for a rank 1 transmission, which is what a MTC device will use, port 7 will be used for PDSCH demodulation and the corresponding RE is seen in FIG. 7.

For PDSCH DMRS ports, the OCCs in Table 1 are applied, which shows the sequence $\bar{w}_p^{(i)}$ for normal cyclic prefix.

TABLE 1

| Antenna port p | $[\bar{w}_p(0)\ \bar{w}_p(1)\ \bar{w}_p(2)\ \bar{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Data repetition over multiple subframes has been proposed for transmitting data to a MTC UE 12 with very high propagation losses. In this case, it is assumed that even the reference signal (e.g. DMRS) is very weak, and the channel between the serving eNB 10 and the UE 12 cannot be reliably estimated within a subframe. The reference signal needs to be accumulated over multiple subframes in order to estimate the channel. This is possible only when the channel is constant over the accumulation time period. When multiple transmit antennas are used at the eNB 10 and reference signals are precoded over the antennas, the same precoder needs to be used over the accumulation time period. One problem is that when the eNB 10 does not have a good knowledge of the channel (this is typically the case as channel feedback is generally not reliable under this scenario), the precoder may not match the actual channel well, and this could result in poor receiving performance at the UE 12.

SUMMARY

Systems and methods for enabling precoding diversity in the time domain are provided. In some embodiments, a User Equipment (UE) includes circuitry including a processing module and a memory module configured to receive an indication that a physical channel is repeated over a set of subframes and receive an indication that the UE can assume that a first subset of the repetitions of the physical channel and a reference signal will use a first precoder. In this way, in some embodiments, the UE can coherently combine the repetitions, including the reference signals used by the physical channel. The ability to coherently combine repetitions of the physical channel improves both the estimates of the physical channel as well as channel estimates derived from the repeated reference signals.

In some embodiments, a precoder cycling technique for providing diversity for repeated transmissions of a physical channel associated with a variably precoded reference signal is provided herein that allows coherent combining of the repeated transmissions. The method indicates to a UE that a physical channel is repeated over a set of subframes and that the UE can assume that subsets of the repetitions of the physical channel and an associated reference signal can be assumed to use one precoder. The repetitions that use the same precoder are determined through system timing or by which subframes carry the same antenna port associated with the physical channel.

Because the same precoder can be used over the subsets, the UE can coherently combine the repetitions in the subsets, including the reference signals used by the physical channel. The ability to coherently combine repetitions of the physical channel improves both the estimates of the physical channel as well as channel estimates derived from the repeated reference signals.

The methods apply to both common and dedicated channels, as well as to control and shared channels. Mechanisms to determine which repetitions use the same precoder are provided for user data as well as for control data, such as system information, random access, paging, and downlink control information (in MTC-Physical Downlink Control Channel (M-PDCCH)).

Enhancements providing additional diversity through frequency hopping in combination with precoder cycling are also described herein.

Methods and systems described herein allow different precoding to be used to increase diversity order for repeated transmissions of a physical channel, while still allowing coherent combining gain for repetitions that use the same precoding. The UE need not be aware of the precoders used, simplifying the UE implementation. Some embodiments have reduced reference signal overhead compared to using a reference signal per antenna port. The methods can apply to a variety of physical channels, including dedicated and common channels, as well as control and shared channels.

One of ordinary skill in the art would realize that various communication nodes (e.g., UE or other station) could perform various processes described herein. Other features and advantages will become obvious to one of ordinary skill in the art in light of the following detailed description and drawings.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
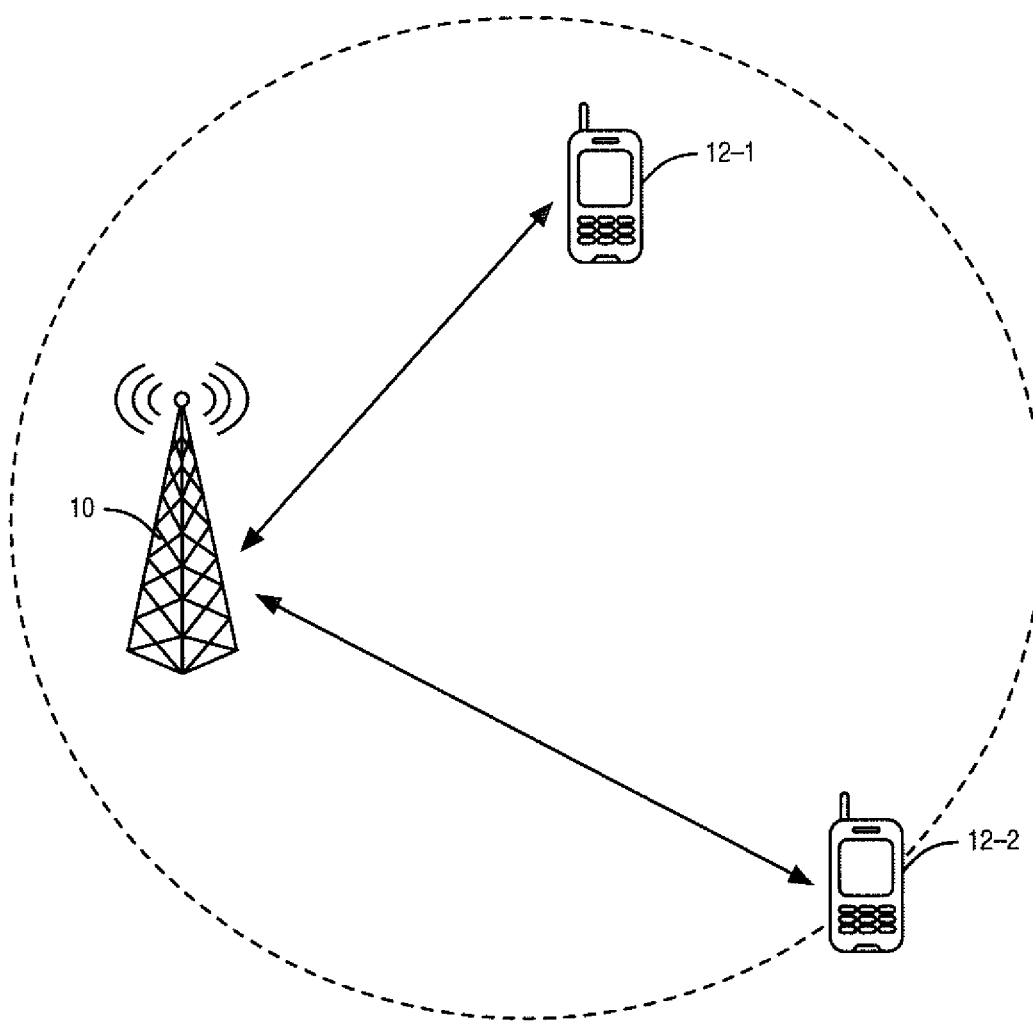
FIG. 1 illustrates a wireless communication network such as a Long Term Evolution (LTE) wireless communication network with multiple wireless devices (User Equipments (UEs) and a network node (evolved NodeB (eNB), according to some embodiments of the present disclosure.
Figure 2:
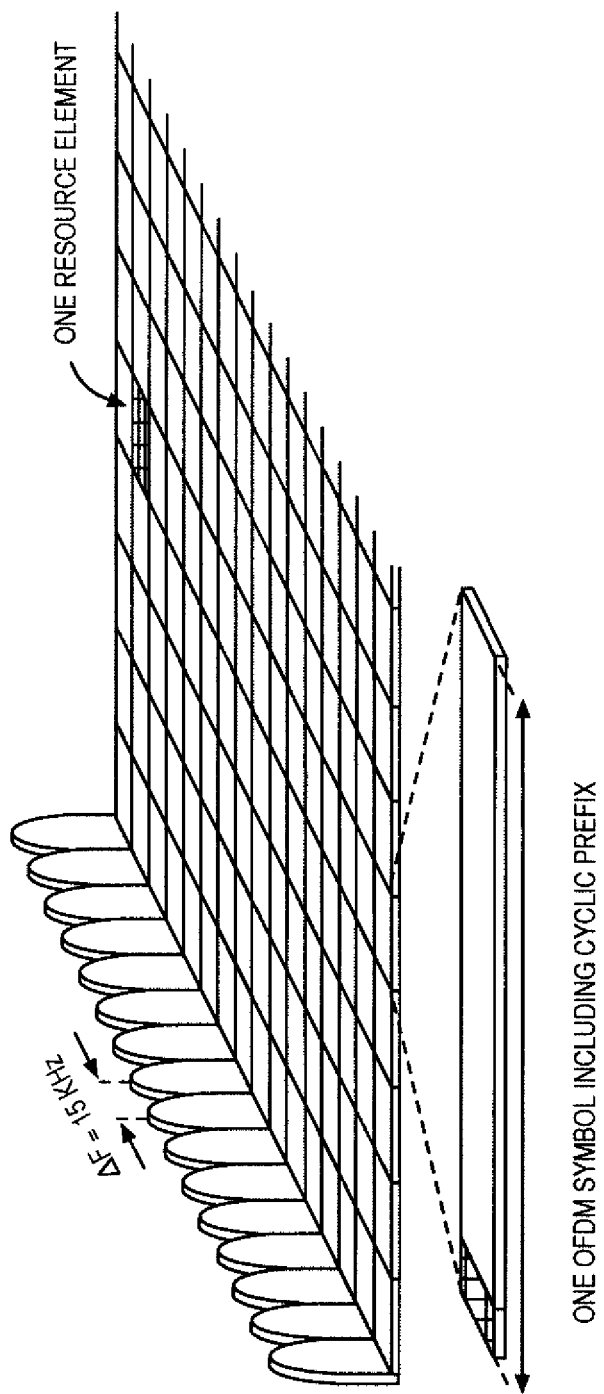
FIG. 2 is a diagram of the LTE downlink physical resource, according to some embodiments of the present disclosure.
Figure 3:
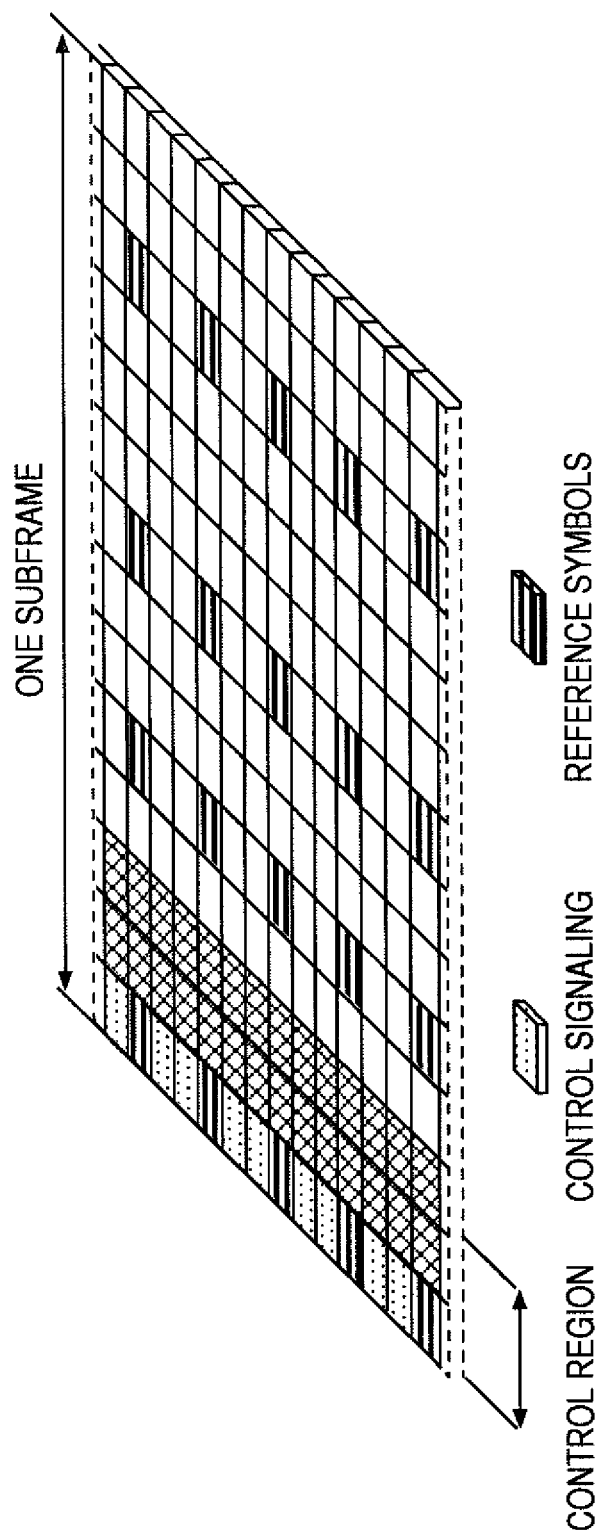
FIG. 3 illustrates a downlink subframe, according to some embodiments of the present disclosure.
Figure 4:
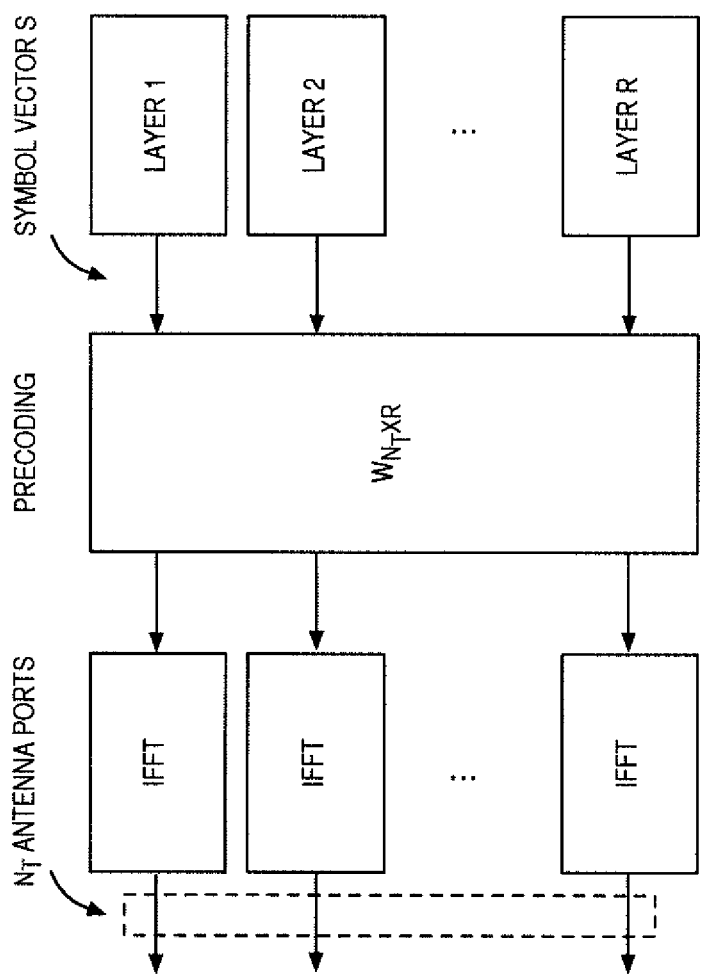
FIG. 4 illustrates a transmission structure of a precoded spatial multiplexing mode in LTE, according to some embodiments of the present disclosure.
Figure 5:
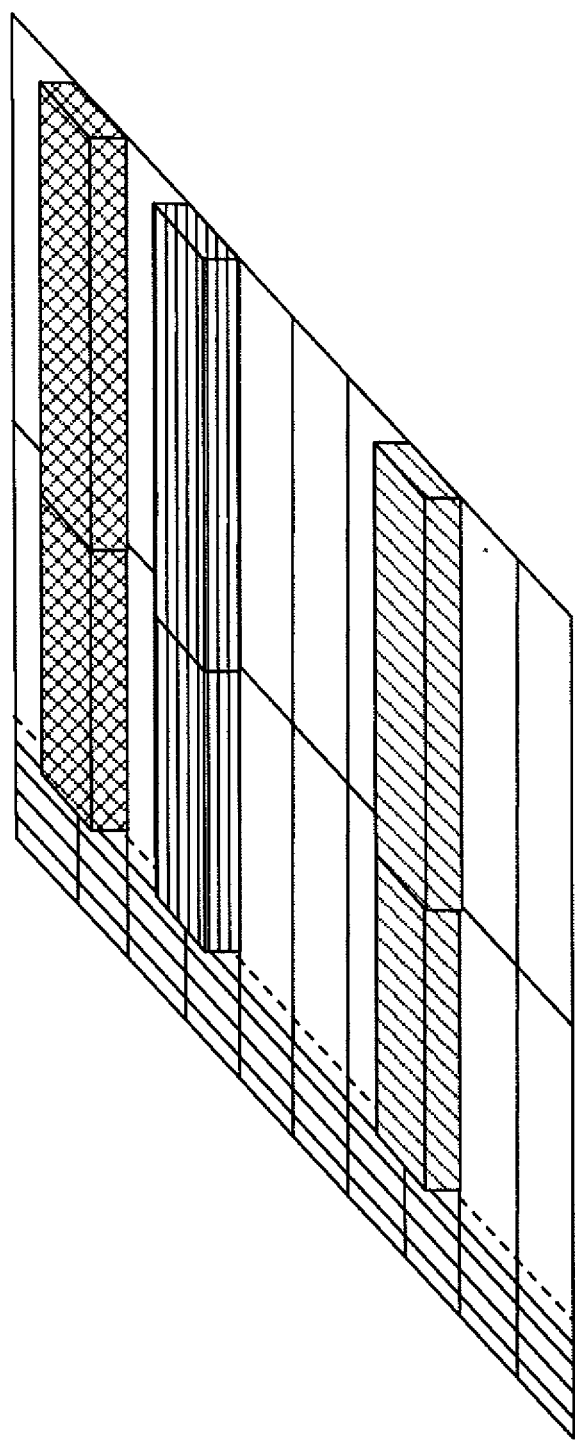
FIG. 5 illustrates a downlink subframe showing a configuration of three Enhanced Physical Downlink Control Channel (EPDCCH) regions, according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device or apparatus (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, Global Positioning Systems (GPS), gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station or other network apparatus can perform the functions described herein.

While Long Term Evolution (LTE) terminology is generally used herein, the current disclosure is not limited thereto. Embodiments would also be applicable to other wireless communication networks as understood by one of ordinary skill in the art.

Figure 8:
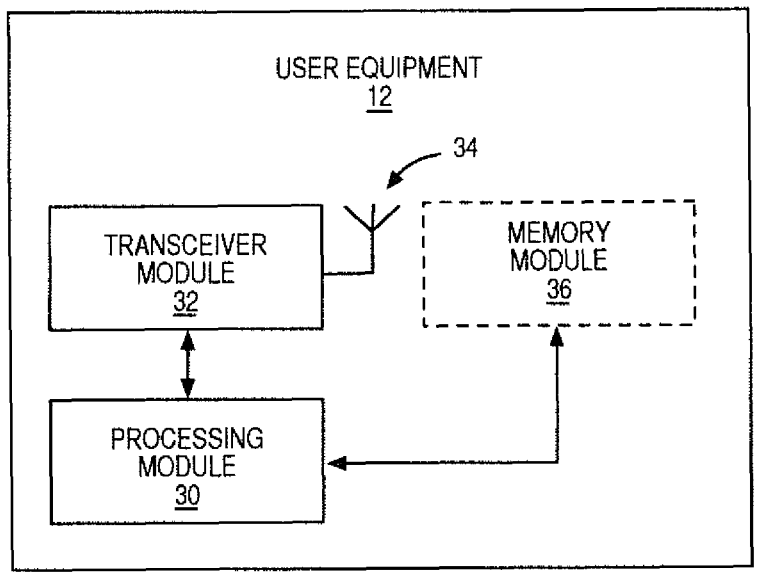
FIG. 8 is a diagram of a UE 12, according to some embodiments of the present disclosure.

FIG. 8 is a block diagram of a UE 12 (e.g., a mobile device), according to some embodiments, that can be used in one or more of the embodiments described herein. The UE 12 may in some embodiments be a mobile device that is configured for Machine-to-Machine (M2M) or Machine-Type Communication (MTC). The UE 12 includes circuitry that comprises a processing module 30 that controls the operation of the UE 12. In some embodiments, the processing module 30 includes one or more processors (e.g., Central Processing Units (CPUs), Application Specific Integrated Circuits (ASICs), Field Programmable Gate Arrays (FPGAs), and/or the like). The processing module 30 is connected to a transceiver module 32 with associated antenna(s) 34 which are used to receive signals from or both transmit signals to and receive signals from an eNB 10 in the network 2. To make use of Discontinuous Reception (DRX), the processing module 30 can be configured to deactivate the receiver or transceiver module 32 for specified lengths of time. The circuitry also comprises a memory module 36 that is connected to the processing module 30 and that stores program and other information and data required for the operation of the UE 12.

Figure 9:
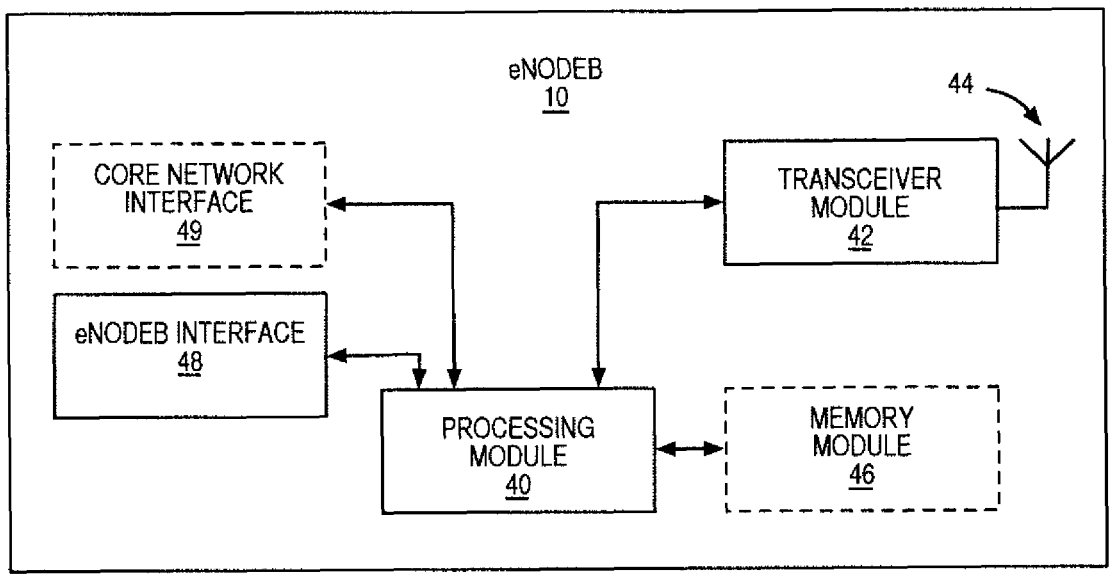
FIG. 9 is a diagram of an eNB 10, according to some embodiments of the present disclosure.

FIG. 9 shows an evolved NodeB (eNB) 10 (or a base station) that can be used in embodiments described herein. It will be appreciated that although a macro eNB will not in practice be identical in size and structure to a micro eNB, for the purposes of illustration, the eNBs 10 are assumed to include similar components. Thus, the eNB 10 includes circuitry that comprises a processing module 40 that controls the operation of the eNB 10. In some embodiments, the processing module 40 includes one or more processors (e.g., CPUs, ASICs, FPGAs, and/or the like). The processing module 40 is connected to a transceiver module 42 with associated antenna(s) 44 which are used to transmit signals to, and receive signals from, UEs 12 in the network 2. The eNB 10 also comprises a memory module 46 that is connected to the processing module 40 and that stores program and other information and data required for the operation of the eNB 10. The eNB 10 also includes components and/or circuitry 48 for allowing the eNB 10 to exchange information with other base stations 10 (for example via an X2 interface) and components and/or circuitry 49 for allowing the eNB 10 to exchange information with nodes in the core network 4 (for example via the S1 interface). It will be appreciated that base stations for use in other types of networks (e.g. Universal Terrestrial Radio Access Networks (UTRAN) or Wideband Code-Division Multiple Access (WCDMA) Radio Area Network (RAN)) will include similar components to those shown in FIG. 9 and appropriate interface circuitry for enabling communications with the other network nodes in those types of networks (e.g. other base stations, mobility management nodes and/or nodes in the core network).

Systems and methods for enabling precoding diversity in the time domain are provided. In some embodiments, UE 12 includes circuitry including a processing module 30 and a memory module 36 configured to receive an indication that a physical channel is repeated over a set of subframes and receive an indication that the UE 12 can assume that a first subset of the repetitions of the physical channel and a reference signal will use a first precoder. In this way, in some embodiments, the UE 12 can coherently combine the repetitions, including the reference signals used by the physical channel. The ability to coherently combine repetitions of the physical channel improves both the estimates of the physical channel as well as channel estimates derived from the repeated reference signals. In some embodiments, the UE 12 receiving these indications includes determining what type of device the UE 12 is or what mode of operation the UE 12 is in. In some embodiments, the indication that the UE 12 can assume that the first subset of the repetitions of the physical channel and the reference signal will use the first precoder is an indication of how many repetitions are in the first subset.

Figure 10:
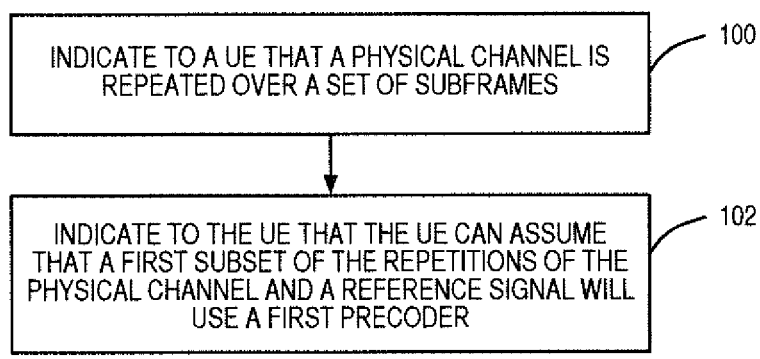
FIG. 10 illustrates the operation of an eNB 10, according to some embodiments of the present disclosure.

FIG. 10 illustrates the operation of an eNB 10, according to some embodiments of the present disclosure. The eNB 10 first indicates to the UE 12 that a physical channel is repeated over a set of subframes (step 100). As discussed above, this may be due to the class of device the UE 12 belongs to or because it is in a coverage enhancement mode, for example. The eNB 10 then indicates to the UE 12 that the UE 12 can assume that a first subset of the repetitions of the physical channel and a reference signal will use a first precoder (step 102). This might enable the UE 12 to use coherent combining or a similar technique to obtain a better decoding of the repetitions than would have been possible otherwise. As discussed in more detail below, this indication of the first subset of the repetitions may be indicated by changing a transmitter port or hopping to a different frequency. Also, in some embodiments, even though frequency hopping is not used, a system timing value such as a parameter that indicates a frequency hopping period may be used to indicate which repetitions are included in the first subset and use the same precoder.

Figure 11:
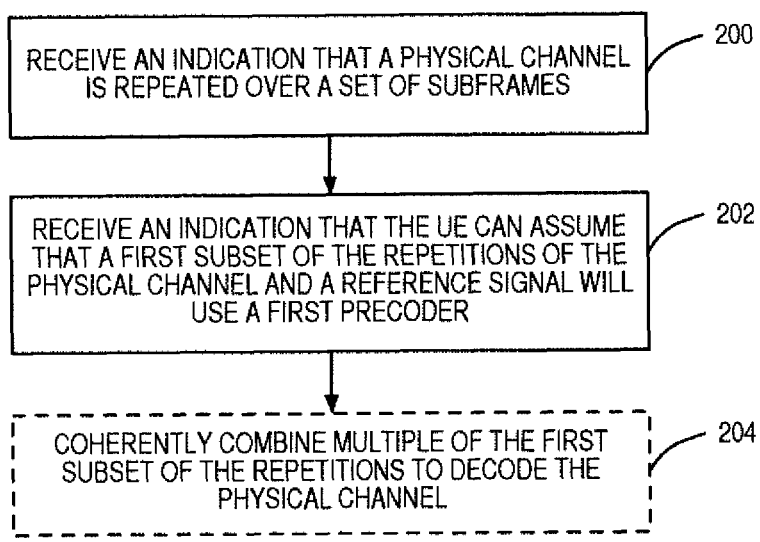
FIG. 11 illustrates the operation of a UE 12, according to some embodiments of the present disclosure.

FIG. 11 illustrates the operation of a UE 12, according to some embodiments of the present disclosure. The UE 12 first receives an indication that a physical channel is repeated over a set of subframes (step 200). As discussed above, this may be due to the class of device the UE 12 belongs to or because it is in a coverage enhancement mode, for example. The UE 12 also receives an indication that the UE 12 can assume that a first subset of the repetitions of the physical channel and a reference signal will use a first precoder (step 202). As discussed in more detail below, this indication of the first subset of the repetitions may be indicated by changing a transmitter port or hopping to a different frequency. Also, in some embodiments, even though frequency hopping is not used, a system timing value, such as a parameter that indicates a frequency hopping period, may be used to indicate which repetitions are included in the first subset and use the same precoder.

In this way, in some embodiments, the UE 12 may optionally coherently combine multiple of the first subset of the repetitions to decode the physical channel (step 204). The ability to coherently combine repetitions of the physical channel improves both the estimates of the physical channel as well as channel estimates derived from the repeated reference signals.

For a data transmission that spans multiple subframes in time, time-domain precoding diversity can be obtained, in addition to other types of diversity (e.g., frequency diversity). The technique applies to all Downlink (DL) transmissions that may be Demodulation Reference Signal (DMRS) based, including both DL control channel (e.g., MTC—Physical Downlink Control Channel (M-PDCCH)) and DL data channel (e.g., Physical Downlink Shared Channel (PDSCH)) and including both broadcast transmissions (e.g., MTC-System Information Block x (SIBx), Re-Authorization Request (RAR), paging) and unicast transmissions (e.g., unicast DL data payload). The precoder W is applied to DMRS as well as the modulation symbols of the corresponding PDSCH in the same subframe. The parameter that needs to be configured is precoder periodicity M, which in some embodiments indicates for how many subframes a UE 12 can assume the precoder used will be the same. In some embodiments, the transmissions discussed herein apply to both M-PDCCH (if applicable) and PDSCH.

For broadcast transmission of MTC-SIB1, the precoder periodicity M is preferably predefined in a specification so that no signaling is necessary. Alternatively, this can be signaled via MIB, if the overhead is deemed acceptable. For broadcast transmission of MTC-SIBs other than MTC-SIB1, e.g., MTC-SIB2, MTC-SIB3, the precoder periodicity M is preferably predefined in a specification so that no signaling is necessary. Alternatively, this can be signaled via a MTC-SIB1. For broadcast transmission of RAR and paging, the precoder periodicity M is preferably predefined in a specification so that no signaling is necessary. Alternatively, this can be signaled via one of the MTC-SIBs. For unicast transmission, the precoder periodicity M is preferably signaled via a UE-specific RRC configuration message.

The value of precoder periodicity M may be determined via at least one of the following:

a number of subframes; which is the straightforward way;

a number of radio frames; where 1 radio frame is 10 subframes in LTE; and/or a function of another period, for example: frequency hopping period.

When the UE 12 has sufficiently good frequency tracking of an eNB's 10 downlink, the UE 12 can coherently accumulate repetitions across a set of M subframes when it knows that eNB has used the same precoding vector. Here, the precoder is a vector since eNB 10 always uses Rank 1 transmission for the low-complexity UE 12. The UE 12 can use this knowledge to improve channel estimation from DMRS in the M subframes. M is an integer greater than or equal to 1. When different precoding and/or frequency hopping are used, the UE 12 can coherently combine across subframes. Therefore, knowing when the same precoding is used also allows it to know when it should perform channel estimation by using the combined reference signals within each set of subframes and coherently combine signals received over different sets of subframes.

The repetitions for which the same precoder is used can be indicated directly or implicitly. In one direct approach, an index of system time, such as the slot index within a subframe $n_s$ from 3GPP TS 36.211 v12.0.0, is used to identify when a new precoder is used. PDSCH transmissions to different UEs 12 should be spread out among different precoders, and so a UE 12 identity may be used to determine when a new precoder is used. In this case a new precoder may be used when $$\left(\left\lfloor \frac{n_s}{2} \right\rfloor + n_{RNTI}\right) \bmod M = 0,$$

where $n_{RNTI}$ is a Radio Network Temporary Identifier (RNTI) such as the Cell RNTI (C-RNTI), Paging RNTI (P-RNTI), Random Access RNTI (RA-RNTI), System Information RNTI (SI-RNTI), etc. In an implicit approach, the physical channel is transmitted on a different antenna port after every M subframes. In an exemplary embodiment for PDSCH, the DMRS port number p could be determined as $$p = 7 + \left(\left\lfloor \frac{n_s}{2M} \right\rfloor + n_{RNTI}\right) \bmod N.$$

Further details of these embodiments are discussed below.

From one set of M subframes to the next set of M subframes, the precoding vector may change to obtain spatial diversity. Over N sets of M subframes, the eNB 10 can cycle through a maximum of N potentially different precoding matrices. It may be desirable for N to be small in order to allow as many as possible of the M*N subframes to be coherently combined. In such a case, N is equal to the number of transmit antennas, and the N precoding vectors are preferably mutually orthogonal. However, note that with DMRS based precoding, the precoding matrices used are transparent to the UE 12, i.e., it is not necessary to predefine or signal the $W_i$ to the UE 12.

Figure 6:
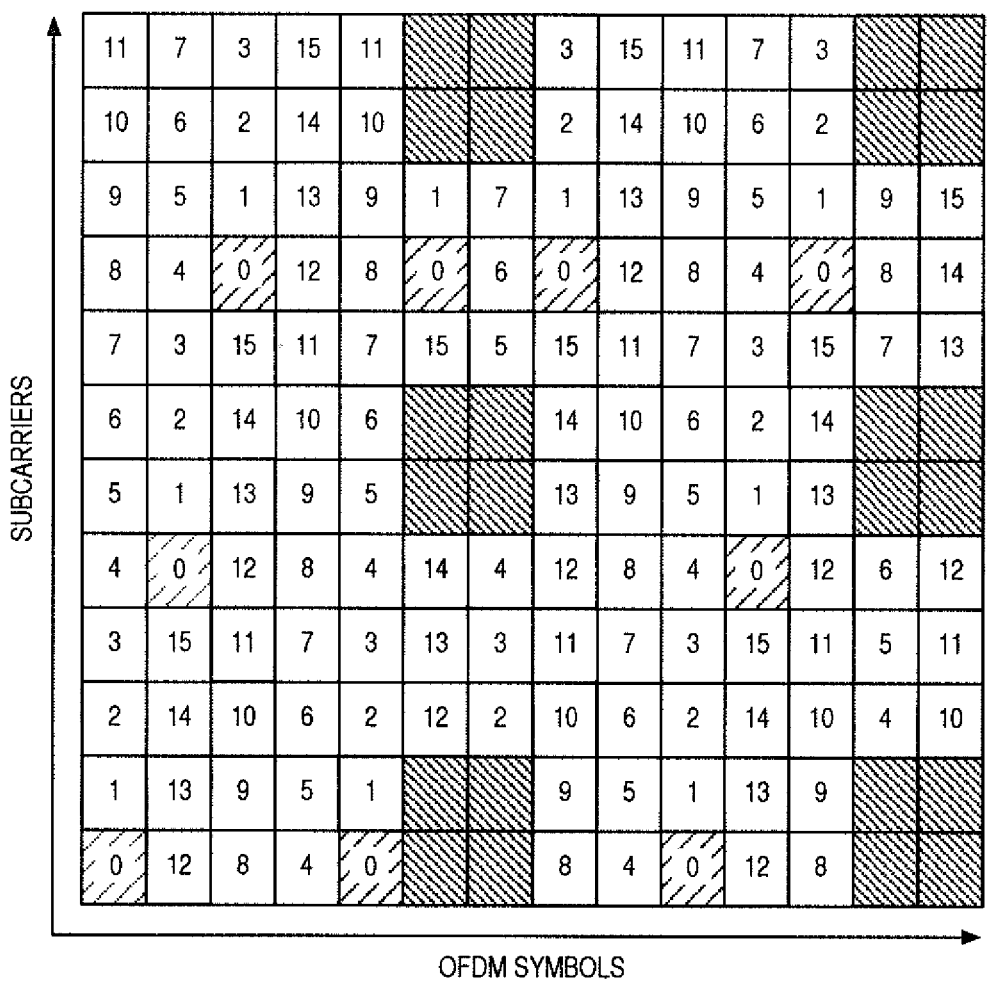
FIG. 6 illustrates a Physical Resource Block (PRB) pair of normal cyclic prefix configuration in a normal subframe, according to some embodiments of the present disclosure.
Figure 7:
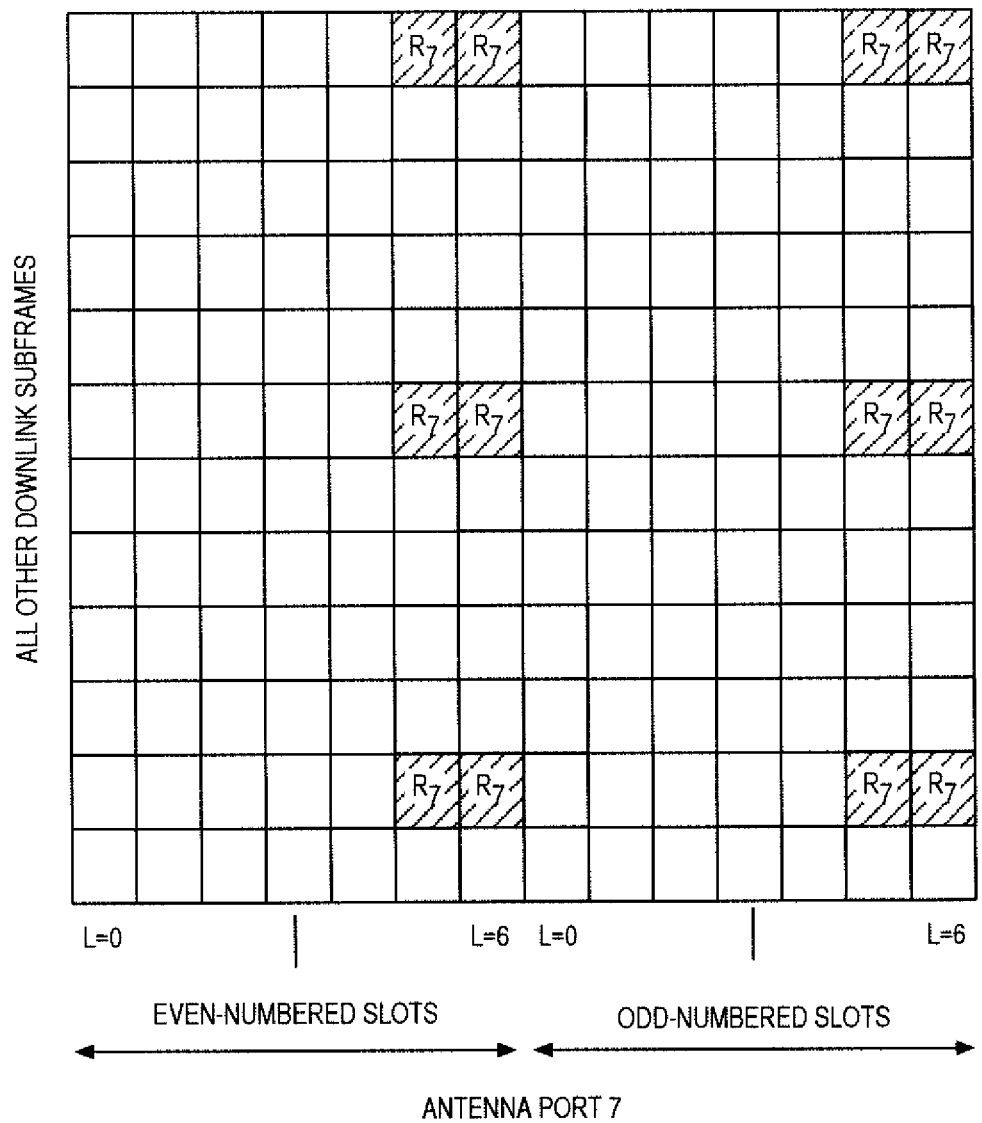
FIG. 7 illustrates a Resource Element (RE) showing port 7 will be used for Physical Downlink Shared Channel (PDSCH) demodulation, according to some embodiments of the present disclosure.

Because rank 1 precoding is used, only one DMRS port (port 7) is necessary in a given subframe, regardless of the number of antenna elements used to transmit on the DMRS port. This has reduced overhead as compared to per-Resource Element (RE) precoder cycling as used for distributed EPDCCH, which uses two (or more) antenna ports. Instead of two groups of REs (e.g., 24 REs per Physical Resource Block (PRB)) for DMRS as in FIG. 6, only one group of REs needs to be reserved for DMRS transmission (e.g., 12 REs per PRB).

Higher transmission power is available for DMRS or PDSCH. That is, the transmission power of port 7 DMRS can be 3 dB higher than to the case in which both port 7 and port 8 are turned on. Alternatively, the power that would have been used for port 8 can be used for PDSCH REs. Note that while for ease of illustration the subframes are shown as consecutive in some of the figures, they may or may not be consecutive in actual operation. Moreover, it is possible that the subframe sets may not all have the same number (M) of usable subframes. This can be due to, e.g., some DL subframes not being available for control/data transmission. Specifically, subframes may be unavailable for DL transmission due to: (a) TDD configuration; (b) MBSFN subframes; (c) measurement gap; etc. Even when the subframes are not consecutive, or the sets contain different number of usable subframes, the same principle applies. That is, as long as the eNB 10 and UE 12 know which subframes use the same precoding vector W, this can be used in channel estimation to enhance performance.

Note also that while for ease of illustration, it is assumed that all PRBs in a narrow band of a given subframe use the same precoding vector, in general this is not necessary. In general, the PRBs in a narrow band can be grouped in P groups of Q consecutive PRBs, so that the UE 12 can assume that the same precoding vector is used among PRBs of a given group, but different precoding matrices may be applied between PRB groups. In this case, precoding diversity method means that for a given PRB group, the precoding vector stays the same within a set of M subframes but may change to a different precoding vector in a different set of M subframes.

Figure 12:
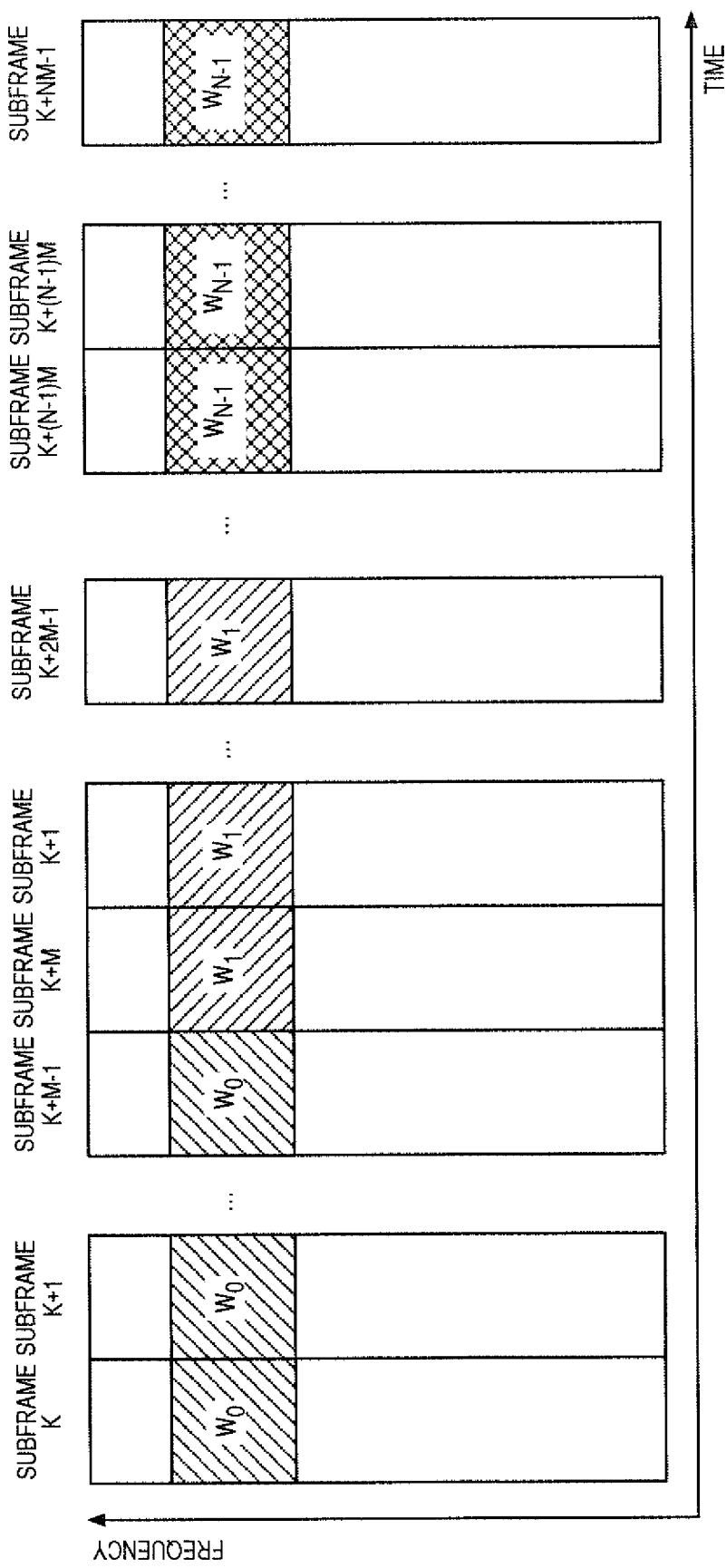
FIGS. 12-14 show multiple ways that time-domain precoding diversity might be obtained, according to some embodiments of the present disclosure.

FIG. 12 illustrates an embodiment using time-domain precoding diversity without frequency hopping. In this embodiment, DMRS based periodic precoder cycling without frequency hopping is used. As illustrated in FIG. 12, for transmitting a given information block, N*M subframes are used. The first set of M subframes use precoder $W_0$, the second set of M subframes use precoder $W_1$, . . . the N-th set of M subframes use precoder $W_{N-1}$.

In this scenario, frequency hopping is not applied. However, due to precoder cycling, spatial domain diversity is achieved to help compensate for the lack of frequency-domain diversity. In some embodiments, even though frequency hopping is not used, a system timing value such as a parameter that indicates a frequency hopping period may be used to indicate the value of M.

Figure 13:
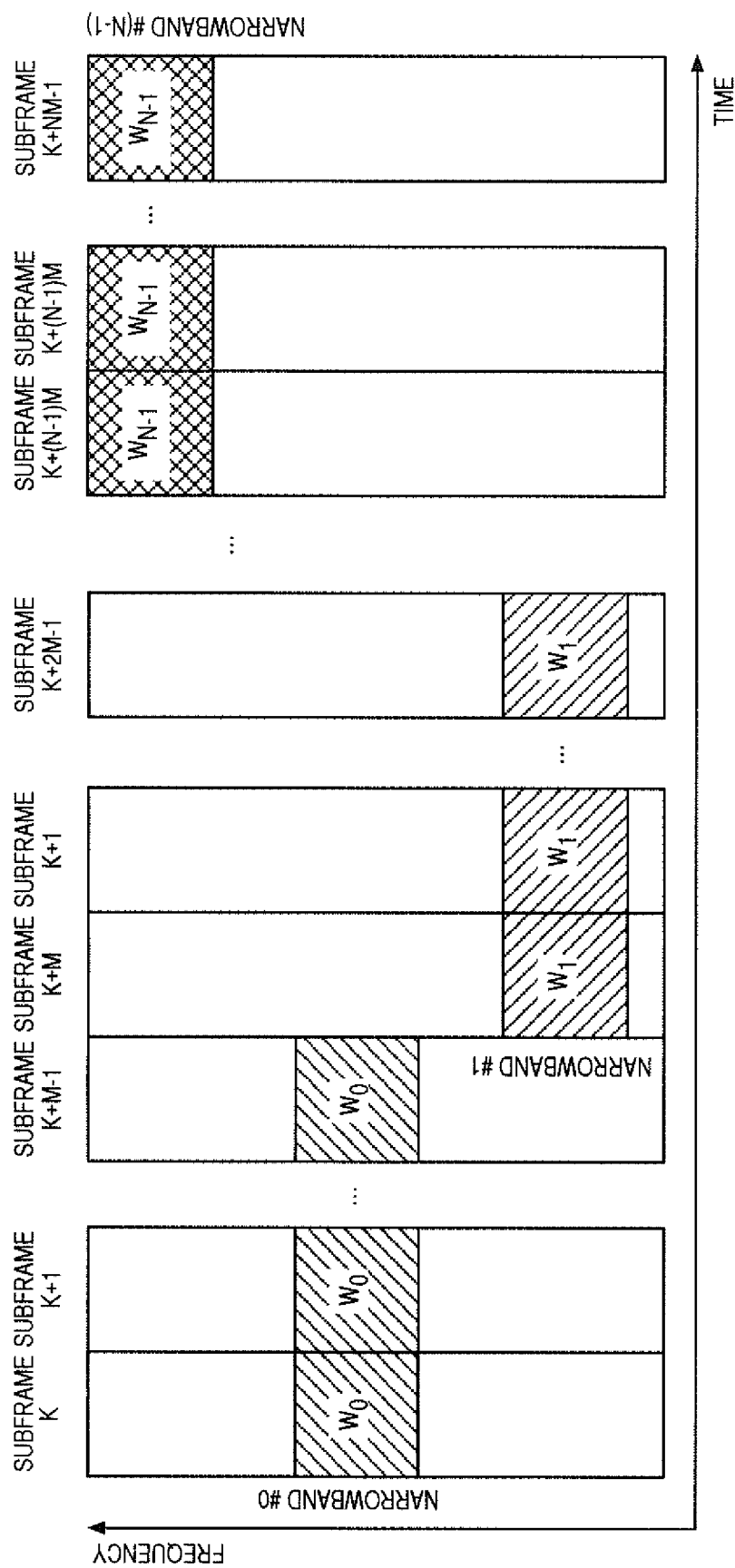

FIG. 13 illustrates an embodiment using time-domain precoding diversity with frequency hopping. In this embodiment, DMRS based periodic precoder cycling with frequency hopping is used. As illustrated in FIG. 13, for transmitting a given information block, N*M subframes are used. The first set of M subframes use precoder $W_0$, the second set of M subframes use precoder $W_1$, and so on until the N-th set of M subframes use precoder $W_{N-1}$. Frequency hopping is applied such that each set can move to a potentially different narrowband location in frequency domain.

In FIG. 13, it is assumed that the frequency hopping period is the same as the precoder cycling period M, where the frequency hopping period is the number of subframes where the transmission is located at a same narrowband before hopping to a different narrowband. In general, the frequency hopping period does not have to be the same as precoder cycling period. The main consideration of frequency hopping patterns (including frequency hopping periods) is lower signaling overhead, low collision between UEs 12, low collision between broadcast-type of transmission and unicast type, overhead of retuning time, etc. The main consideration of a precoder cycling period is coherence time of the channel.

For example, the frequency hopping period may be 2*M subframes, so that in one frequency hopping period, two different precoders can be applied to gain diversity within a frequency hopping period. Either way, the value of M may be indicated to the UE 12 by the indication of the frequency hopping period.

Figure 14:
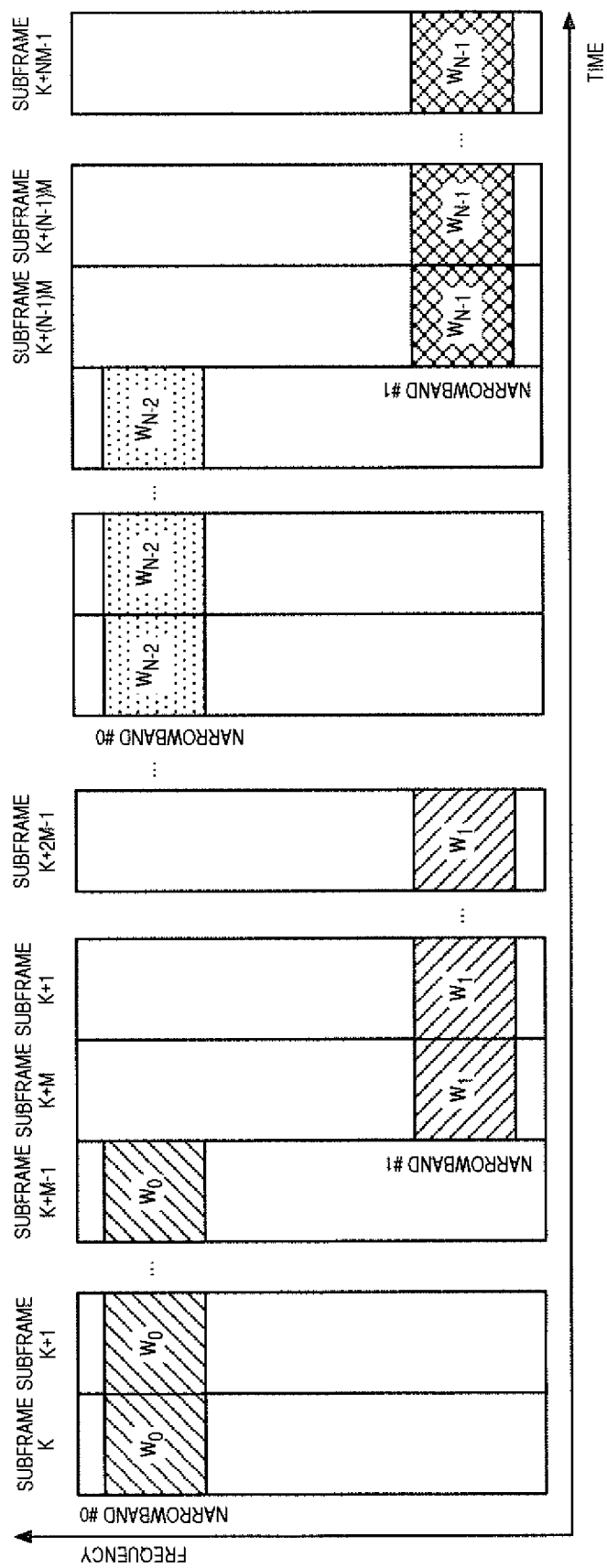

In FIG. 14, an embodiment is illustrated where the DL frequency hopping pattern is only between two narrow bands only: {Narrowband #0, Narrowband #1}. Different UEs 12 may use different ones of {Narrowband #0, Narrowband #1} so that their transmissions are multiplexed over the same subframes. Using only two narrow band locations has the benefit of simplicity and collision reduction when transmissions from multiple UEs 12 are ongoing simultaneously. In this case, the precoder cycling provides spatial diversity to compensate for the limited frequency diversity.

Figure 15:
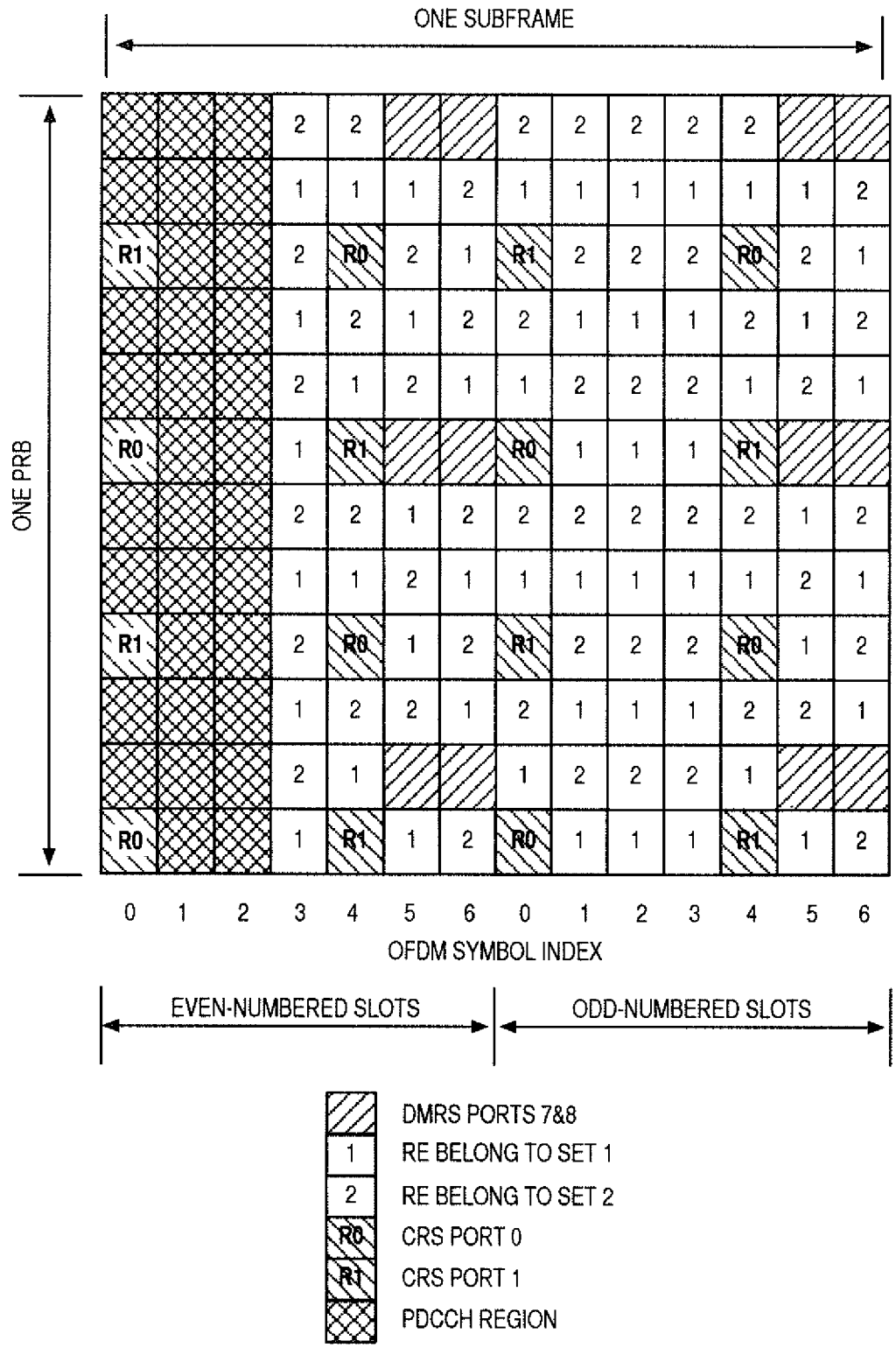
FIGS. 15 and 16 illustrate data transmission with two Demodulation Reference Signal (DMRS) ports, according to some embodiments of the present disclosure.

In some embodiments, two DMRS ports may be used to increase spatial diversity where a subset of REs in a subframe are associated with DMRS port 7 while the rest of the REs in a subframe are associated with DMRS port 8. "Association" here means that the data transmitted over the REs is precoded using the same precoder as that used by the associated DMRS port. An example is shown in FIG. 15 where the set of REs labelled "1" (referred to as set 1) is associated to one of the two DMRS ports (either port 7 or port 8), while the set of REs labelled "2" (referred to as set 2) is associated with the other DMRS port. The two sets of REs shown in FIG. 15 are just an example, and there can be other partitions.

Figure 16:
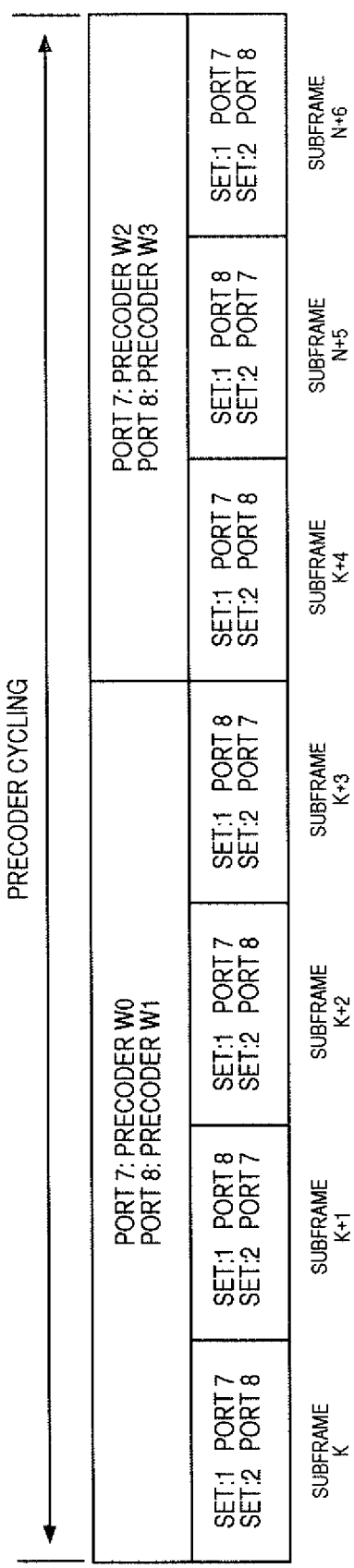

To take advantage of the time repetition of the same data over multiple subframes, the association between a set of REs and a DMRS port can be changed between two subframes over a repetition period. An example is illustrated in FIG. 16 where data transmissions are repeated in 7 subframes (i.e., subframes k to k+6). One set of precoders is used in the first 4 subframes (i.e., subframes k to k+3) while a different set of precoders is used in the next 3 subframes (i.e., subframes k+4 to k+6). In subframe k, REs of set 1 are associated with DMRS port 7 while REs of set 2 are associated with DMRS port 8. The associations are then switched in subframe k+1, i.e., REs of set 1 are associated with DMRS port 8 while REs of set 2 are associated with DMRS port 7. The associations are also switched in the subsequent subframes.

The port to each RE set association can be predefined in the first subframe, and then the association is switched in the subsequent subframes. The precoders for DMRS ports 7 & 8 are unchanged within a precoder cycling period. In this example, precoders W1 and W2 are used for port 7 and port 8 in the first four subframes. The precoders are switched to W3 and W4 in the next 3 subframes. This allows coherent DMRS and data combining over each precoder cycling period. After the combining, the channel associated with each DMRS port can be estimated. The estimated channel on each DMRS port can be used to equalize the signals received on the associated data REs in each subframe. The equalized data from each precoder cycling period is then coherently combined before being demodulated and decoded. In some embodiments, this allows the signals transmitted on the same set of REs to go through different precoded channels in different subframes and thus enables better channel averaging over multiple subframes.

Figure 17:
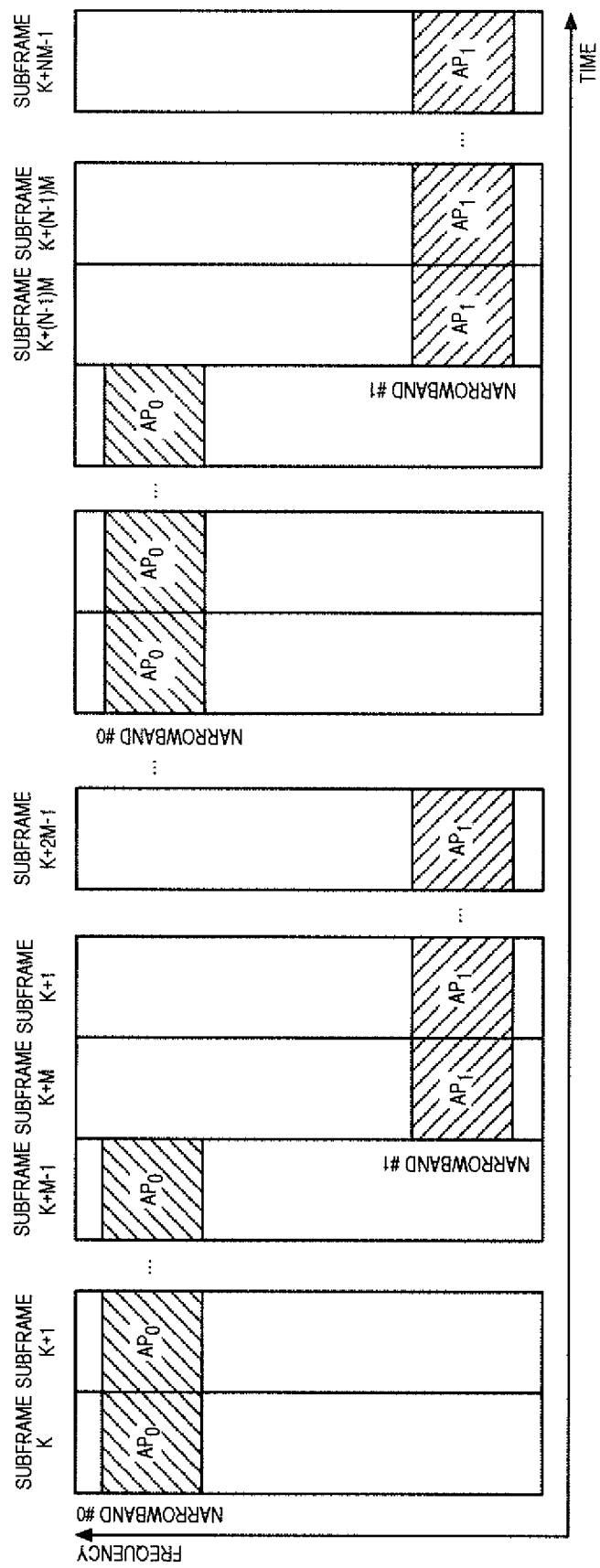
FIG. 17 shows antenna port cycling with frequency hopping between two narrowbands, according to some embodiments of the present disclosure.

In another embodiment, the antenna port used by the physical channel can change from one set of M subframes to another set for a given bundle. Here "bundle" refers to the total set of physical channel repetitions associated with a single control or data channel transmission. Repetitions using the same antenna port and subcarriers can be coherently combined. This is illustrated in FIG. 17. In this embodiment, it is assumed that there are two antenna ports ($AP_0$, $AP_1$) available, and they are alternated within the bundle. Although it is not necessary in general, this example also assumes that antenna port hopping period is the same as frequency hopping period M.

One example is localized M-PDCCH transmission. Instead of using the same antenna port for all subframes in a bundle, the antenna port can vary according to parameters M and N. For instance, the single antenna port P used for localized transmission is given in Table 2 (from Table 6.8A.5-1 of 3GPP TS 36.211 v12.0.0) with:

$$n' = n_{ECCE,low} \bmod N_{ECCE}^{RB} + (n_{RNTI} + n) \bmod \min(N_{ECCE}^{EPDCCH}, N_{ECCE}^{RB})$$

where $n_{ECCE,low}$ is the lowest ECCE index used by this EPDCCH transmission in the EPDCCH set, $n_{RNTI}$ equals the C-RNTI, and $N_{ECCE}^{EPDCCH}$ is the number of ECCEs used for this EPDCCH. Here $$n = \left\lfloor \frac{n_s}{2M} \right\rfloor \bmod N$$

is the index of antenna port cycling period, n=0, 1, ... N−1. The antenna port used is held constant over M subframes in an antenna port cycling period. Variable $n_s$ is the slot number within a radio frame on which the M-PDCCH is transmitted.

TABLE 2

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

In some embodiments, a similar antenna port hopping scheme can be applied to PDSCH transmission as well.

In addition to spatial diversity, other types of diversity can be applied in a similar manner. In one example, the diversity is a Redundancy Version (RV) diversity. A given set of M subframes uses a same RV. From one set to a next set, a potentially different RV is used. Preferably, the sequence of RVs to cycle through is predefined in a specification.

In one alternative, the starting RV to use for a bundle is fixed, e.g., RV=0, thus requiring no signaling. In some embodiments, this is appropriate for M-PDCCH transmissions and PDSCH transmissions that have no associated M-PDCCH.

In another alternative, the starting RV to use for a bundle is dynamic or semi-static, and is signaled by eNB 10. This can be used for PDSCH where the associated M-PDCCH can provide the starting RV in a dynamic manner.

As a result of the foregoing embodiments, different precoding can be used to increase diversity order for repeated transmissions of a physical channel, while still allowing coherent combining gain for repetitions that use the same precoding. The UE 12 need not be aware of the precoders used, simplifying the UE 12 implementation.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Figure 18:
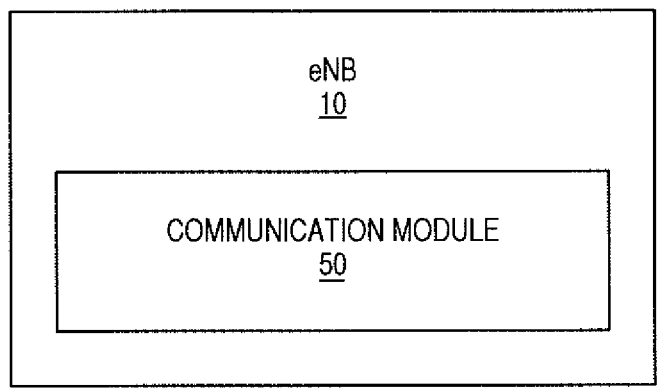
FIG. 18 is a diagram of an eNB 10 including modules, according to some embodiments of the present disclosure

FIG. 18 is a diagram of an eNB 10 including modules, according to some embodiments of the present disclosure. The eNB 10 includes at least a communication module 50 implemented in software. The communication module 50 provides the functionality of the eNB 10 described herein. For example, the communication module 50 may be operative to indicate to a UE 12 that a physical channel is repeated over a set of subframes and the communication module 50 may be further operative to indicate to the UE 12 that the UE 12 can assume that a first subset of the repetitions of the physical channel and a reference signal will use a first precoder.

Figure 19:
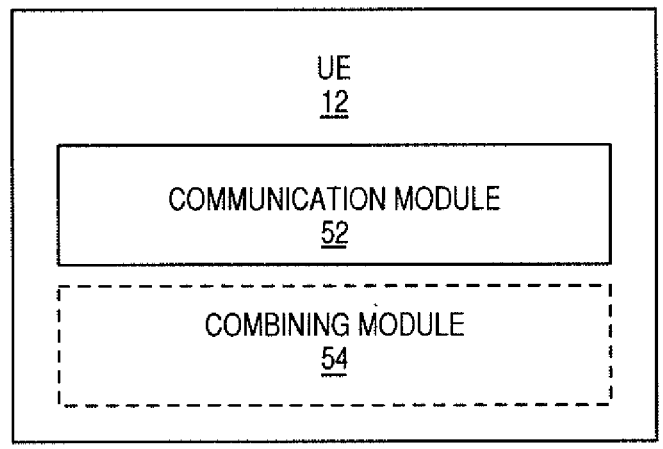
FIG. 19 is a diagram of a UE 12 including modules, according to some embodiments of the present disclosure.

FIG. 19 is a diagram of a UE 12 including modules, according to some embodiments of the present disclosure. The UE 12 includes at least a communication module 52 and optionally a combining module 54 implemented in software. The communication module 52 provides the functionality of the UE 12 described herein. For example, the communication module 52 may be operative to receive an indication that a physical channel is repeated over a set of subframes, and the communication module 52 may be further operative to receive an indication that the UE 12 can assume that a first subset of the repetitions of the physical channel and a reference signal will use a first precoder. The optional combining module 54 may be operative to coherently combine multiple of the first subset of the repetitions to decode the physical channel.

Figure 20:
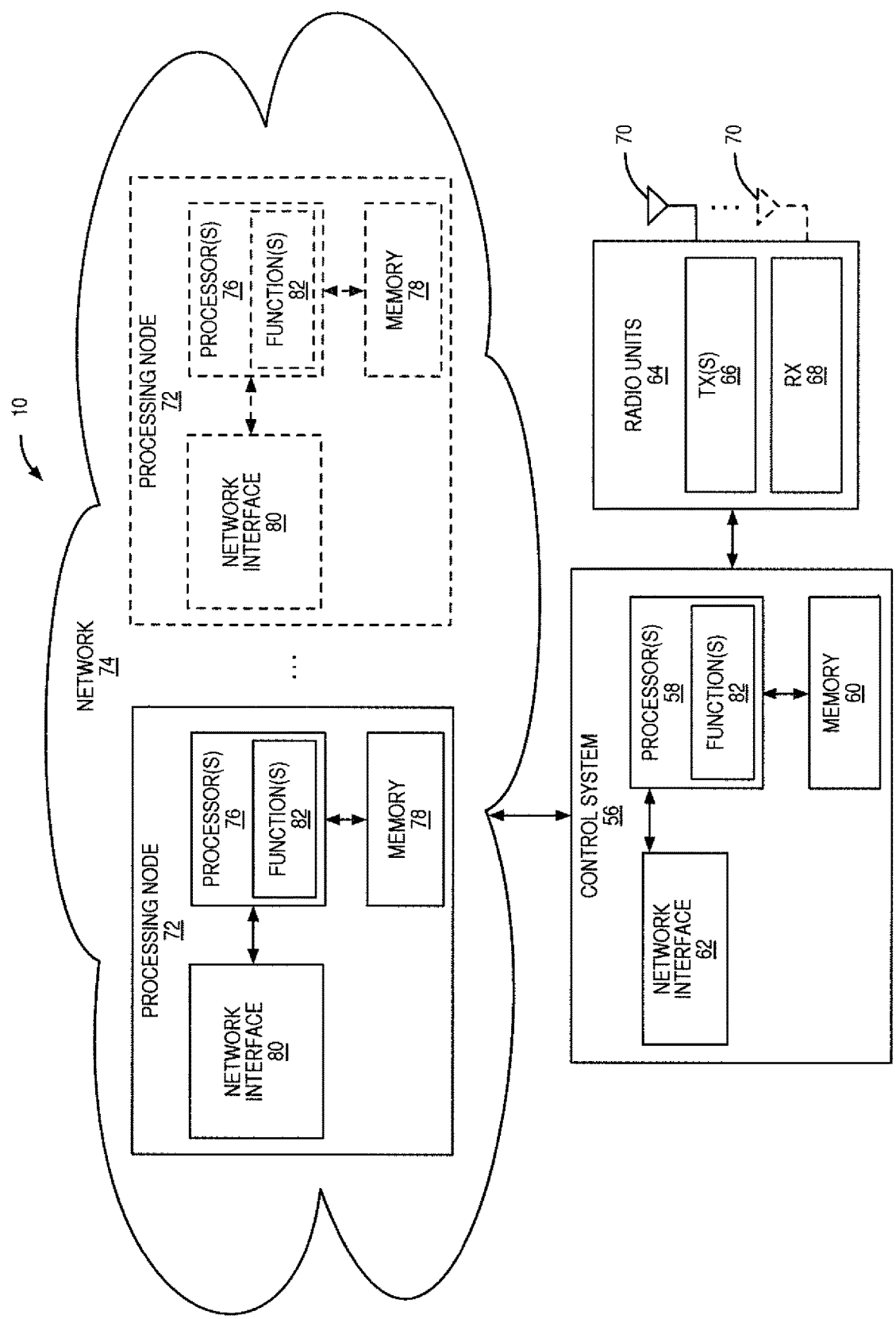
FIG. 20 is a schematic block diagram that illustrates a virtualized embodiment of eNB 10, according to some embodiments of the present disclosure.

FIG. 20 is a schematic block diagram that illustrates a virtualized embodiment of eNB 10, according to some embodiments of the present disclosure. As used herein, a "virtualized" network node is an implementation of the eNB 10 in which at least a portion of the functionality of the eNB 10 is implemented as a virtual component(s) (e.g., via a virtual machine(s) executing on a physical processing node(s) in a network(s)). As illustrated, in this example, the eNB 10 includes a control system 56 that includes one or more processors 58 (e.g., CPUs, ASICs, FPGAs, and/or the like), a memory 60, and a network interface 62. In addition, since the eNB 10 is a radio network node, the eNB 10 further includes one or more radio units 64 that each includes one or more transmitters 66 and one or more receivers 68 coupled to one or more antennas 70, as described above. The control system 56 is connected to the radio unit(s) 64 via, for example, an optical cable or the like. The control system 56 is connected to one or more processing nodes 72 coupled to or included as part of a network(s) 74 via the network interface 62. Each processing node 72 includes one or more processors 76 (e.g., CPUs, ASICs, FPGAs, and/or the like), memory 78, and a network interface 80.

In this example, functions 82 of the eNB 10 described herein are implemented at the one or more processing nodes 72 or distributed across the control system 56 and the one or more processing nodes 72 in any desired manner. In some particular embodiments, some or all of the functions 82 of the eNB 10 described herein are implemented as virtual components executed by one or more virtual machines implemented in a virtual environment(s) hosted by the processing node(s) 72. As will be appreciated by one of ordinary skill in the art, additional signaling or communication between the processing node(s) 72 and the control system 56 is used in order to carry out at least some of the desired functions 82. Notably, in some embodiments, the control system 56 may not be included, in which case the radio unit(s) 64 communicates directly with the processing node(s) 72 via an appropriate network interface(s). In some other embodiments, the eNB 10 is entirely virtualized (i.e., does not include the control system 56 or the radio unit(s) 64).

In some embodiments, a computer program including instructions which, when executed by at least one processor, causes the at least one processor to carry out the functionality of eNB 10 or a node (e.g., a processing node 72) implementing one or more of the functions 82 of the eNB 10 in a virtual environment according to any of the embodiments described herein is provided.

In some embodiments, a carrier comprising the aforementioned computer program product is provided. The carrier is one of an electronic signal, an optical signal, a radio signal, or a computer readable storage medium (e.g., a non-transitory computer readable medium such as memory).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The following acronyms are used throughout this disclosure.

3GPP Third Generation Partnership Project
ASIC Application Specific Integrated Circuit
BW Bandwidth
CP Cyclic Prefix
CPU Central Processing Unit
C-RNTI Cell RNTI
DCI Downlink Control Information
DL Downlink
DMRS Demodulation Reference Signal
DRX Discontinuous Reception
ECCE Enhanced Control Channel Element
eNB Evolved Node-B
EPDCCH Enhanced Physical Downlink Control Channel
EREG Enhanced Resource Element Group
FPGA Field Programmable Gate Array
GPS Global Positioning System
LTE Long Term Evolution
M2M Machine to Machine
MIMO Multiple-Input Multiple-Output
M-PDCCH MTC Physical Downlink Control Channel
MTC Machine Type Communication
OCC Orthogonal Cover Code
OFDM Orthogonal Frequency-Division Multiplexing
PBCH Physical Broadcast Channel
PCFICH Physical Control Format Indicator Channel
PDCCH Physical Downlink Control Channel
PDSCH Physical Downlink Shared Channel
PHICH Physical Hybrid-Automatic Repeat Request Indicator Channel
PMCH Physical Multicast Channel
PMI Precoding-Matrix Indicator
PRB Physical Resource Block P-RNTI Paging RNTI
RAN Radio Access Network
RAR Random Access Response
RA-RNTI Random Access RNTI
RB Resource Block
RE Resource Element
RNTI Radio Network Temporary Identifier
RS Reference Symbol
RV Redundancy Version
SIB System Information Block
SI-RNTI System Information RNTI
TDD Time Division Duplexing
TFRE Time/Frequency Resource Element
UE User Equipment
UTRAN Universal Terrestrial Radio Access Network
VoIP Voice-over-IP
VPN Virtual Personal Network
WCDMA Wideband Code-Division Multiple Access Those skilled in the art will recognize improvements and modifications to the embodiments of the present disclosure. All such improvements and modifications are considered within the scope of the concepts disclosed herein.

What is claimed is:

1. A User Equipment, UE, comprising:
circuitry comprising a processing module and a memory module configured to:
receive an indication that a physical channel is repeated over a set of subframes; and
receive an indication that the UE can assume that a first subset of the repetitions of the physical channel and a reference signal will use a first precoder;
wherein the circuitry is configured to receive the indication that the UE can assume that the first subset of the repetitions of the physical channel and the reference signal will use the first precoder by being configured to:
determine that the physical channel was transmitted on a first antenna port in a first subframe and on a second antenna port in a second subframe.

2. The UE of claim 1 wherein the circuitry is further configured to:
coherently combine a plurality of the first subset of the repetitions to decode the physical channel and the reference signal.

3. The UE of claim 2 wherein the circuitry is further configured to:
receive the physical channel on one of a plurality of frequency bands, where the frequency band is determined according to an index of a subframe in which the physical channel is transmitted; and
use a reference signal transmitted using a second precoder to receive a second subset of the repetitions of the physical channel.

4. The UE of claim 2 wherein the circuitry is further configured to receive the indication that the UE can assume that the first subset of the repetitions of the physical channel and the reference signal will use the first precoder by being configured to:
determine a system timing value for the first subset of the repetitions of the physical channel.

5. The UE of claim 4 wherein the system timing value is a parameter that indicates a frequency hopping period.

6. The UE of claim 5 wherein the physical channel is a Physical Downlink Shared Channel, PDSCH.

7. The UE of claim 6 wherein the indication that the physical channel is repeated over the set of subframes and the indication that the UE can assume that the first subset of the repetitions of the physical channel and the reference signal will use the first precoder are received from an evolved Node-B, eNB.

8. A method of operating a User Equipment, UE, comprising:
receiving an indication that a physical channel is repeated over a set of subframes; and
receiving an indication that the UE can assume that a first subset of the repetitions of the physical channel and a reference signal will use a first precoder;
wherein receiving the indication that the UE can assume that the first subset of the repetitions of the physical channel and the reference signal will use the first precoder comprises:
determining that the physical channel was transmitted on a first antenna port in a first subframe and on a second antenna port in a second subframe.

9. The method of claim 8 further comprising:
coherently combining a plurality of the first subset of the repetitions to decode the physical channel and the reference signal.

10. The method of claim 9 further comprising:
receiving the physical channel on one of a plurality of frequency bands, where the frequency band is determined according to an index of a subframe in which the physical channel is transmitted; and
using a reference signal transmitted using a second precoder to receive a second subset of the repetitions of the physical channel.

11. The method of claim 9 wherein receiving the indication that the UE can assume that the first subset of the repetitions of the physical channel and the reference signal will use the first precoder further comprises:
determining a system timing value for the first subset of the repetitions of the physical channel.

12. The method of claim 11 wherein the system timing value is a parameter that indicates a frequency hopping period.

13. The method of claim 12 wherein the physical channel is a Physical Downlink Shared Channel, PDSCH.

14. The method of claim 13 wherein the indication that the physical channel is repeated over the set of subframes and the indication that the UE can assume that the first subset of the repetitions of the physical channel and the reference signal will use the first precoder are received from an eNB.

15. An evolved NodeB, eNB, comprising:
circuitry comprising a processing module and a memory module configured to:
indicate to a User Equipment, UE, that a physical channel is repeated over a set of subframes; and
indicate to the UE that the UE can assume that a first subset of the repetitions of the physical channel and a reference signal will use a first precoder;
wherein the circuitry is configured to indicate that the UE can assume that the first subset of the repetitions of the physical channel and the reference signal will use the first precoder by being configured to:
transmit the physical channel on a first antenna port in a first subframe and on a second antenna port in a second subframe.

16. The eNB of claim 15 wherein the circuitry is further configured to:
transmit the physical channel on one of a plurality of frequency bands, where the frequency band is determined according to an index of a subframe in which the physical channel is transmitted; and use a second precoder to transmit the reference signal for a second subset of the repetitions of the physical channel.

17. The eNB of claim 15 wherein the circuitry is further configured to indicate that the UE can assume that the first subset of the repetitions of the physical channel and the reference signal will use the first precoder by being configured to:
indicate to the UE a system timing value for the first subset of the repetitions of the physical channel.

18. The eNB of claim 17 wherein the system timing value is a parameter that indicates a frequency hopping period.

19. The eNB of claim 18 wherein the physical channel is a Physical Downlink Shared Channel, PDSCH.

20. A method of operating an evolved NodeB, eNB, for providing diversity across repeated transmissions, comprising:
indicating to a User Equipment, UE, that a physical channel is repeated over a set of subframes; and
indicating to the UE that the UE can assume that a first subset of the repetitions of the physical channel and a reference signal will use a first precoder;
wherein indicating that the UE can assume that the first subset of the repetitions of the physical channel will use the first precoder comprises:
transmitting the physical channel on a first antenna port in a first subframe and on a second antenna port in a second subframe.

21. The method of claim 20, further comprising:
transmitting the physical channel on one of a plurality of frequency bands, the frequency band determined according to an index of a subframe in which the physical channel is transmitted; and
using a second precoder to transmit the reference signal for a second subset of the repetitions of the physical channel.

22. A User Equipment, UE, comprising:
circuitry comprising a processing module and a memory module configured to:
receive an indication that a physical channel is repeated over a set of subframes; and
receive an indication that the UE can assume that a first subset of the repetitions of the physical channel and a reference signal will use a first precoder;
wherein the circuitry is configured to receive the indication that the UE can assume that the first subset of the repetitions of the physical channel and the reference signal will use the first precoder by being configured to:
determine that the physical channel is transmitted on a first and a second antenna port in a first and a third subframe, where a first and second subset of resource elements are associated with the first and second antenna ports respectively in the first and the third subframe; and
determine that the first subset of resource elements is encoded with the first precoder and the second subset of resource elements is encoded with a second precoder.

23. The UE of claim 22 wherein the circuitry is further configured to:
determine that the first and the second subset of resource elements are associated with the second and first antenna ports respectively in a second and a fourth subframe; and
determine that the first subset of resource elements is encoded with the second precoder and the second subset of resource elements is encoded with the first precoder.

* * * * *

UNITED STATES PATENT AND TRADEMARK OFFICE
CERTIFICATE OF CORRECTION

| | |
|---|---|
| PATENT NO. | : 11,190,241 B2 |
| APPLICATION NO. | : 15/223453 |
| DATED | : November 30, 2021 |
| INVENTOR(S) | : Blankenship et al. |

It is certified that error appears in the above-identified patent and that said Letters Patent is hereby corrected as shown below:

In the Specification

In Column 4, Line 50, delete "$\overline{W}_p{}^{(i)}$" and insert -- $\overline{W}_{p^{(i)}}$ --, therefor.

In Column 10, Line 41, delete "precoder W" and insert -- precoder $W_i$ --, therefor.

Signed and Sealed this
Sixteenth Day of August, 2022

Katherine Kelly Vidal
*Director of the United States Patent and Trademark Office*